3,148,590
TRACERS FOR AUTOMATIC MACHINE TOOLS
Thomas Bancroft, Brough, Samuel Walker, Kirkella, James Edward Lucas, Brough, and Geoffrey Bower Ducker, North Ferriby, England, assignors to Blackburn Aircraft Limited, Brough, England, a British company
Filed Nov. 1, 1961, Ser. No. 149,344
Claims priority, application Great Britain, July 27, 1961, 27,328/61
5 Claims. (Cl. 90—62)

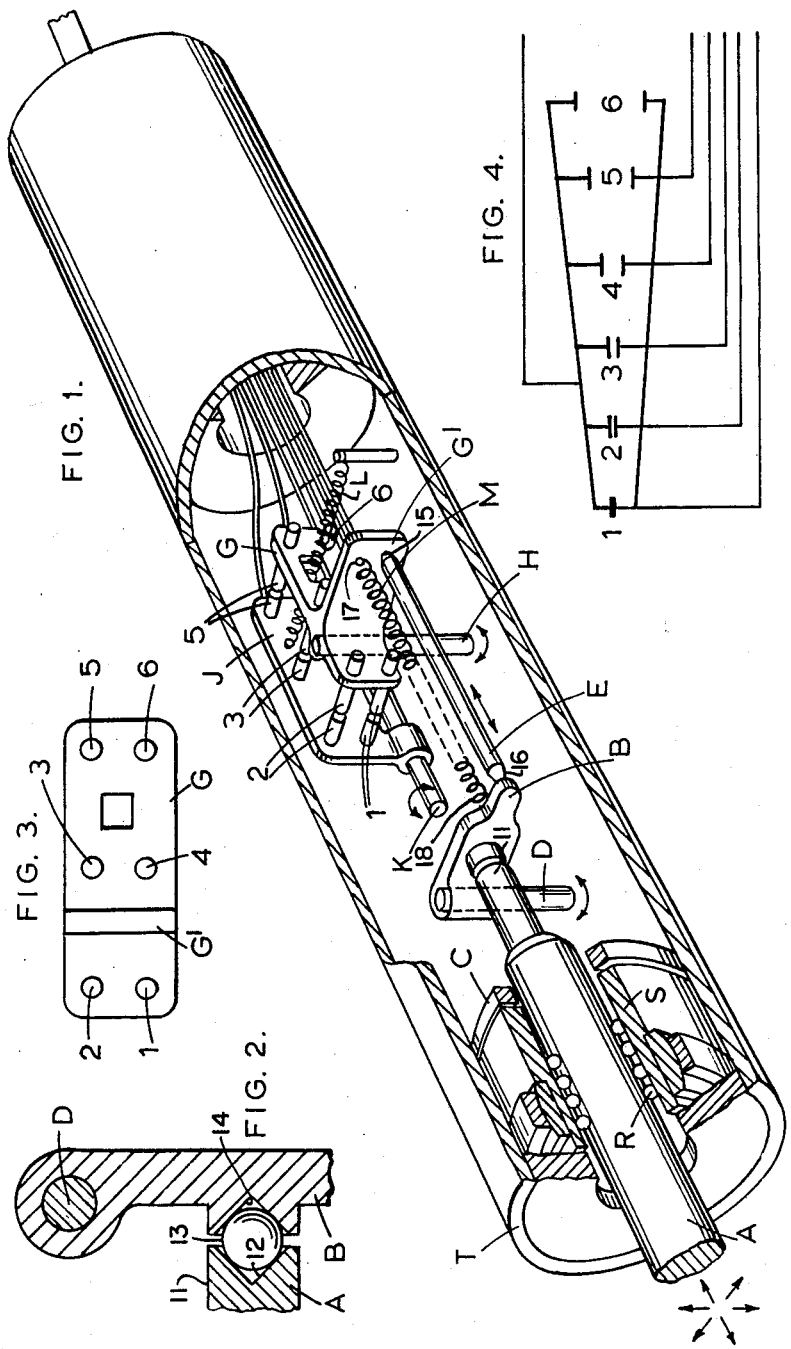

This invention relates to improvements in electric tracer control devices for machine tools.

Such tracers comprise a feeler spindle or stylus which engages a model or template and by its displacement closes contacts in circuit with magnetic relays which govern the movements of the cutting tool of the machine tool.

The known tracers are of complex design yet their feelers or styli require appreciable loads for their operation with the result that a model may be scored or otherwise damaged.

Now therefore the object of the present invention is to provide an electric tracer of more simple basic design requiring lighter stylus operating loads yet with more robust construction.

To this end according to the present invention the feeler spindle or stylus is mounted for axial movement in anti-friction bearings disposed in a freely angularly displaceable spherical mounting and is adapted by its axial and angular movements to produce corresponding angular displacements of a main contact carrying plate pivoted on an axis normal to that of a co-operating contact plate each of which plates is loaded by a low rate spring the tension of which remains substantially constant. Conveniently, a sleeve capable of universal angular movement in a spherical bearing carries the anti-friction means such as balls for guiding the stylus for limited axial movement in said sleeve and at the inner end of such stylus are means for causing its axial and angular movements to produce corresponding angular displacements of an arm pivoted on an axis parallel to the pivotal axis of the main contact carrying plate in an arrangement in which the spring loading of the main contact plate also acts on the feeler to urge it axially in work engaging direction. More particularly a tracer for a machine tool according to the present invention comprises a feeler capable of limited axial movement in a spherical bearing of a housing and adapted by its linear and angular displacements to rock an arm pivoted in the housing and connected by a thrust rod to a first small mass spring-loaded contact carrying plate pivoted on an axis parallel the pivot axis of the arm, the contacts of which plate may engage co-operating contacts of a second small-mass spring-loaded contact carrying plate pivotable on an axis normal to that of the first contact carrying plate in an arrangement in which the co-operating pairs of contacts are arranged in two rows such that rocking of the first contact carrying plate in one direction initially closes one pair of contacts and its further movement closes another pair of contacts with rocking of the second contact carrying plate and rocking of the first contact carrying plate in the opposite direction closes first a third and then a fourth pair of contacts with rocking of the second contact carrying plate, while still further such movement of the first and second plates close another or other contacts. The making of the second pair of contacts may so rock the second contact carrying plate that the first made pair of contacts will separate and likewise the making of the fourth pair of contacts may separate the third pair of contacts, while a fifth pair of contacts on engaging will open the previously made pairs of contacts, and similarly for a sixth (maximum) pair of contacts. The first pair of contacts make on clockwise movement of the contact carrier on outward movement of the feeler while further movement thereof allows the second pair of contacts to make with rocking of the co-operating contact carrier either so that both first and second pairs of contacts are made or so that the displacement of the carrier by the engaging second pair of contacts causes the first pair of contacts to separate. Counter-clockwise movement of the contact carrier on inward movement of the feeler initially makes the third pair of contacts while its further movement allows the fourth pair of contacts to make and rock the co-operating contact carrier either to close both third and fourth pairs or to separate the third pair of contacts. Still further counter-clockwise movement of the contact carrier allows the fifth pair of contacts to engage and cause further displacement of the co-operating contact carrier to open the fourth pair of contacts or both third and fourth pairs of contacts. Any still further movement of the contact carrier will make a blind or unconnected pair of contacts and open the others to interrupt the electric circuit and so act as a safety device on any excess movement of the feeler.

The first pair of contacts controls inward movement of the cutting tool, the first and second pairs of contacts or the second pair alone (by controlling the energisation of two clutches) control(s) inwards and sideways movement of the cutter, the third pair of contacts controls sideways movement, the fourth pair of contacts (or the third and fourth pairs) controls sideways and outwards movement of the cutter, and the fifth pair of contacts controls the outward movement of the cutter.

By the introduction of suitable switches the tracer may be adapted to operate only on four pairs of contacts the first to control inward movement of the cutter, the second to control sideways movement, the third outwards movement and the fourth reversed sideways movement.

The mass of the moving components of the tracer are kept to a minimum to reduce inertia of such parts and the loading springs are low rate close coiled springs which minimise the load required to give the necessary movements to such movable parts to close the various pairs of contacts with the riding of one on another.

There is simplification in the basic design comprising the axially and angularly movable feeler in its simple minimum friction mounting, the means for converting such movements of the feeler to rock the contact carrying plate, the contact carrying plate itself and the co-operating contact carrying plate both of which are of minimum mass with their low rate springs as compared with known tracers with complex cross-heads and rows of contacts which are in turn closed on movement of the feeler. The means for converting the movement of the feeler conveniently comprise known means for that purpose comprising a conical recess in the end of the feeler in which engages a ball also located in a conical recess in an arm such that angular movement of the feeler causes rocking movement of such arm which is also rocked on axial movement of the feeler.

The arm as stated above is pivoted on an axis parallel to the pivot axis of the first contact carrying plate and its movements are transmitted thereto by a thrust rod, conveniently one with tapered ends engaging in curved recesses in the arm and a part of the contact carrying plate respectively which is held in place by the urging of the latter part towards the arm by its loading spring which thus also reacts on the feeler to urge it in work engaging direction.

Now in order that the invention may be clearly understood an embodiment thereof is by way of example hereinafter more fully described with reference to the accompanying diagrammatic drawings, in which:

FIG. 1 is a perspective view of the tracer, partly broken away and shown in section, FIG. 2 is an enlarged fragmentary sectional view of the inner end of the feeler and the actuating lever, FIG. 3 is an elevation of the main contact carrying plate, and FIG. 4 is a diagram showing the sequence of contact actuation.

The tracer is contained in a tubular housing T in one end of which is a sleeve or bushed spherical bearing S capable of limited free angular movement within which are anti-friction balls R and through which extends the feeler A for axial movement as well as universal angular movement to the extent permitted by the spherical bearing S. The internal end 11 of the feeler A has a conical recess 12 in which is a ball 13 (see FIG. 2) located in a like recess 14 in the arm B which is supported on the pivot shaft D providing an arrangement in which the axial as well as the angular movements of the feeler A cause pivotal movement of the actuating lever or arm B on the axis of the pivot shaft D.

A first or main light-weight contact carrying plate G is supported on the pivot shaft H parallel to the pivot shaft D and has a lateral extension G1 intermediate its ends between which and the arm B extends a thrust rod E having tapered or pointed ends which engage in confronting rounded recesses 15, 16 in the lateral extension G1 and the arm B respectively. The main contact carrying plate G is loaded by a low-rate helical tension spring M, which by urging the extension G1 towards the arm B holds the thrust rod E in place in the recesses 15, 16. One end 17 of the tension spring M is connected to the lateral extension G1 at a point spaced from the recess 15 along a line parallel to the pivotal axis of the shaft H. The tension in the spring M thus produces no torque tending to cause or oppose pivotal movement of the main contact plate G. The other end 18 of the spring M is connected to the actuating lever B at a point which is spaced from the recess 16 along a line perpendicular to the pivotal axis of the shaft D. The spring M thus produces a torque acting on the actuating lever or arm B yieldingly urging it to rotate in a clockwise direction on pivot shaft D, as viewed in FIG. 1.

Clockwise rotation of the actuating lever B acts on the feeler A through the ball 13 to urge the feeler A axially in its work engaging direction to engage the model or template, the extent of which movement is limited by the collar C (which is fast with the feeler A) abutting the end of the sleeve S.

A second light-weight co-operating contact carrying plate J is supported on a shaft pivot K extending normal to the shaft H and is loaded by a low rate helical tension spring L which conveniently extends freely through an aperture in the plate G.

The plates G and J together carry six pairs of co-operating contacts 1, 2, 3, 4, 5 and 6 arranged in two rows of three each (see FIG. 3) of which two of the contacts namely contacts 1 and 2 of the plate G are disposed on one side of its pivot axis with the others on the opposite side thereof while all the co-operating contacts of the plate J are disposed on the same of its pivot axis, in an arrangement in which pairs of contacts engage on rocking of the plate G and some on engaging rock the plate J and so separate the previously engaged pair with make-before-break contact sequence. Thus the pair of contacts 1 close initially on outwards movement of the feeler, governing outward movement of the machine tool cutter, and the pair of contacts 2 close on rocking the plate G against its spring M on angular movement of the feeler A causing rocking of the arm B to control the cutter to move inwards and sideways. Axial inwards displacement of the feeler A further displaces the arm B which causes the plate G to close the contacts 3 to control the cutter to move sideways, and its still further displacement of the arm B on angular movement of the feeler closes the pair of contacts 4 to control the cutter to move sideways and outwards, with further inwards axial movement of the feeler causing closing of the pair of contacts 5 to cause the cutter to move outwards. Any further axial movement of the feeler A will close the pair of contacts 6 and as these are not connected in circuit so open the circuit to the cutter controlling relays and electro-magnetic clutches and thus act as a safety means.

We claim:

1. A tracer device comprising a hollow tubular body member; an elongated stylus member extending outwardly of said body member; bearing means supporting said stylus member intermediate its ends in said body member for free axial movement and limited universal angular movement with respect thereto, said stylus member having an outer end portion adapted for displacement during the course of tracing the contour of a shape to be formed by a machine tool controlled by said device and an inner end portion within said body member; lever means mounted in said body member for pivotal movement about a first axis; means connecting the inner portion of said stylus member to said lever means for angular displacement of said lever means in response to both axial and angular displacements of said stylus; first contact carrying means mounted within said body member for pivotal movement about a second axis, said second axis being spaced from and parallel to said first axis; second control carrying means mounted within said body member for pivotal movement about a third axis, said third axis being perpendicular to said first and second axes; linkage means connecting said lever means and said first contact carrying means for simultaneous angular displacements together; means yieldingly urging one of said contact carrying means toward the other; a plurality of pairs of co-operating contacts, one contact of each pair being carried by one of said contact carrying means, progressive angular displacement of said first contact carrying means producing sequential engagement and disengagement between the co-operating contacts of successive pairs with make-before-break sequence between the contacts of successive pairs and circuit means connected to said contacts, said circuit means extending exteriorly of said body for controlling said machine tool.

2. A tracer device according to claim 1, wherein said inner end portion of said stylus member has a conical recess formed therein coaxially therewith and in which said lever means has a conical recess formed therein confronting said first-named conical recess in axial alignment therewith and wherein said means connecting the inner end of said stylus member to said lever means comprises a ball retained in simultaneous engagement with both of said conical recesses.

3. A tracer device according to claim 1, wherein said lever means and said first contact carrying means have confronting rounded recesses formed therein, said recesses being radially spaced from said first and second axes, and wherein said linkage means comprises an elongated member with tapered ends received in said rounded recesses, said device further comprising an elongated tension spring having one end connected to said first contact means at a location spaced from the rounded recess in said first contact means along a line parallel to said second axis, the other end of said spring being connected to said lever means at a location spaced from the rounded recess in said lever means along a line perpendicular to said first axis.

4. A tracer device according to claim 3, wherein said inner end portion of said stylus member has a conical recess formed therein coaxially therewith and in which said lever means has a conical recess formed therein confronting said first-named conical recess in axial alignment therewith and wherein said means connecting the inner ends of said stylus member to said lever means comprises a ball retained in simultaneous engagement with both of said conical recesses.

5. A tracer device according to claim 1, wherein said bearing means comprises a spherically shaped portion providing said universal angular movement and a plurality of anti-friction balls arranged in said spherically shaped portion and laterally engaging said stylus member to provide for said free axial movement thereof.

References Cited in the file of this patent

UNITED STATES PATENTS

| | | |
|---|---|---|
| 2,397,108 | Hanna et al. | Mar. 26, 1946 |
| 2,868,092 | Fancannon et al. | Jan. 13, 1959 |

FOREIGN PATENTS

| | | |
|---|---|---|
| 758,007 | Great Britain | Sept. 26, 1956 |
| 872,597 | Great Britain | July 12, 1961 |